(12) United States Patent
Arnold et al.

(10) Patent No.: US 6,975,332 B2
(45) Date of Patent: Dec. 13, 2005

(54) SELECTING A TRANSFER FUNCTION FOR A DISPLAY DEVICE

(75) Inventors: R. David Arnold, Mountain View, CA (US); Terence S. Dowling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 10/795,681

(22) Filed: Mar. 8, 2004

(65) Prior Publication Data

US 2005/0195213 A1 Sep. 8, 2005

(51) Int. Cl.$^7$ ............................................. G09G 5/00
(52) U.S. Cl. ..................... 345/611; 345/589; 345/592; 345/594; 345/597
(58) Field of Search ........................ 345/611, 589, 592, 345/594, 597

(56) References Cited

U.S. PATENT DOCUMENTS

| | | | |
|---|---|---|---|
| 5,847,712 A * | 12/1998 | Salesin et al. | 345/582 |
| 5,910,796 A | 6/1999 | Gormish | |
| 6,651,893 B2 * | 11/2003 | He et al. | 235/494 |
| 2003/0071923 A1 * | 4/2003 | Eskin | 348/674 |
| 2003/0194116 A1 * | 10/2003 | Wong et al. | 382/128 |
| 2004/0075674 A1 * | 4/2004 | Bu | 345/690 |

OTHER PUBLICATIONS

Nelson, "High quality hardware line antialiasing" *Journal of graphics tools*, vol. 2 No. 1: pp. 29-46 (1997).
Nelson, "Twelve characteristics of correct antialiased lines" *Journal of graphics tools*, vol. 1 No. 4: pp. 1-20 (1996).

* cited by examiner

Primary Examiner—Matthew C. Bella
Assistant Examiner—Mike Rahmjoo
(74) Attorney, Agent, or Firm—Fish & Richardson P.C.

(57) ABSTRACT

Methods, systems and apparatus for generating test patterns for selecting a transfer function of a display device. A method includes generating multiple simulated transfer functions for a display device, rendering multiple patterns of anti-aliased parallel lines on the display device, each pattern rendered according to a corresponding one of the simulated transfer functions and including off-vertical lines and off-horizontal lines, receiving an input from a user of the display device selecting one of the patterns rendered on the display device and setting a transfer function for the display device to the simulated transfer function representing the selected pattern, the transfer function characterizing a relationship between an applied input voltage and an output luminance for any given pixel on the display device.

36 Claims, 2 Drawing Sheets

SELECTING A TRANSFER FUNCTION FOR A DISPLAY DEVICE

TECHNICAL FIELD

This invention relates to selecting a transfer function for a display device.

BACKGROUND

Display devices, such as cathode ray tube (CRT) display devices and liquid crystal display (LCD) devices, are generally characterized by a non-linear relationship between an applied input voltage and an output luminance (light intensity) for any given pixel. This relationship can be approximated by a transfer function, such as an exponential function, luminance=voltage$^{gamma}$, where voltage is normalized to one. The relationship is non-linear for many display devices because exponent "gamma" is generally not equal to one.

Gamma determination and correction are important for applications involving image processing. Some image processing software applications allow a computer user to enter the gamma for the display device, so that images can be gamma corrected before display. However, the user must first know the value of the gamma. Other programs allow a user to manually adjust the gamma, but the user must still manually determine the overall gamma correction, taking into account any gamma correction that may already be included in the images to be displayed.

SUMMARY

The present invention provides methods and apparatus, including computer program products, to generate test patterns for selecting a transfer function for a display device.

In one aspect, the invention features a method including generating multiple simulated transfer functions for a display device, rendering multiple patterns of anti-aliased parallel lines on the display device, each pattern rendered according to a corresponding one of the simulated transfer functions, receiving an input from a user of the display device selecting one of the patterns rendered on the display device, and setting a transfer function for the display device to the simulated transfer function representing the selected pattern, the transfer function characterizing a relationship between an applied input voltage and an output luminance for any given pixel on the display device.

In embodiments, the method can include instructing the user to select one of the patterns having a most uniform thickness of lines. The multiple simulated transfer functions can be simulated gamma functions, each of the simulated gamma functions characterizing multiple non-linear relationships between the applied input voltage and the output luminance for any given pixel on the display device.

Each pattern can include a first group of slanted lines that can be in a generally vertical orientation, the first group representing an effect in a scan-line direction, and a second group of slanted lines that can be in a generally horizontal orientation, the second group representing an effect between lines. Generating multiple simulated transfer functions can include generating multiple simulated transfer functions within a software application. The display device can be a cellular telephone or a personal data assistant (PDA).

In another aspect, the invention features a method including rendering multiple patterns of anti-aliased parallel lines on a display device, each pattern rendered according to a corresponding one of a plurality of simulated gamma functions, receiving an input from a user of the display device that selects one of the patterns rendered on the display device, and setting a gamma function for the display device to the simulated gamma function representing the selected pattern.

In embodiments, rendering can include generating the multiple simulated transfer functions for the display device. The gamma function can characterize a non-linear relationship between an applied input voltage and an output luminance for any given pixel on the display device.

The method can include instructing the user to select one of the patterns having a most uniform thickness of lines. Each pattern can include a first group of slanted lines that can be in a generally vertical orientation, the first group representing an effect in a scan-line direction, and a second group of slanted lines that can be in a generally horizontal orientation, the second group representing an effect between lines.

The display device can be a cellular telephone or a Personal Data Assistant (PDA).

In another aspect, the invention features a method including generating multiple simulated transfer functions for a display device, rendering multiple patterns of anti-aliased parallel lines on the display device, each pattern rendered according to a corresponding one of the simulated transfer functions and including off-vertical lines and off-horizontal lines, receiving an input from a user of the display device selecting one of the patterns rendered on the display device, and setting a transfer function for the display device to the simulated transfer function representing the selected pattern, the transfer function characterizing a relationship between an applied input voltage and an output luminance for any given pixel on the display device.

In embodiments, the method can include instructing the user to select one of the patterns having a most uniform thickness of lines. The display device can be a red, green, blue (RGB) display device or monochrome display device.

Advantages that can be seen in implementations of the invention include one or more of the following.

Simple test patterns using slanted lines that are nearly vertical and nearly horizontal are used by untrained users to choose a transfer function. The user simply chooses the best pattern from among several choices.

Each pattern uses slanted lines that are nearly vertical and nearly horizontal. One of them captures the effect in the scan line direction and the other one expresses the effect between scan lines. Since the physical display device has different properties in these directions, which is especially true with CRTs, a less than perfect display device exhibits different properties pixel-to-pixel within a scan line than it does between scan lines. The pattern allows the user to easily separate high and low frequency patterns that depend on the differences between horizontal and vertical effects.

The generated patterns emphasize high contrast effects that are characteristic of text. Text is largely made up of these high contrast transitions. A "less than perfect" display device can have a different transfer function for high frequency transitions than a "bulk" transfer function exhibited in a larger region. Most other methods of evaluating a transfer function use larger regions.

In general, each independent color channel has its own distinct transfer function. This method can be applied independently to red green and blue channels.

The details of one or more embodiments of the invention are set forth in the accompanying drawings and the descrip-

DETAILED DESCRIPTION

Figure 1:
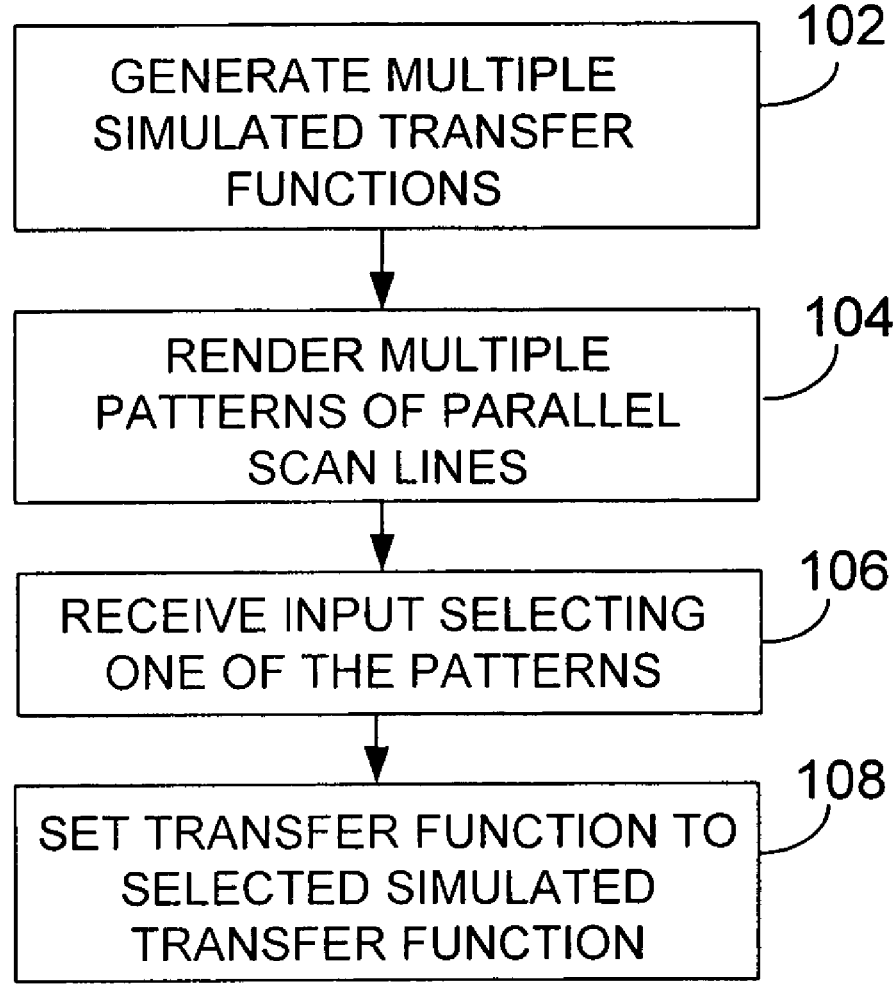
FIG. 1 is a flow diagram.

As shown in FIG. 1, a process 100 for selecting a transfer function for a display device includes generating (102) multiple simulated transfer functions for the display device. A transfer function characterizes a relationship between an applied input voltage and an output luminance for any given pixel on the display device. The transfer function is used in the process of converting image data to light emitted by a display device or ink deposited on a medium, e.g., paper.

In one implementation, the transfer function is a gamma function. Non-linearity of the electro-optical radiation transfer function of cathode ray tubes (CRTs) is often expressed by the exponent gamma. This particular transfer function describes how much visible radiant energy (cd/m2) results from voltages applied to the CRT electron-gun. Because most of the other characteristics of CRT-based computer monitors are linear (including digital to analog converters and video amplifiers) the resulting transfer function has the same gamma value determining its non-linearity.

$$I = A(k_1 D + k_2)^{gamma}$$

where $k_1$ and $k_2$ are the system gain and offset, D is the normalized pixel value, A is the maximum radiant intensity of the CRT and I is the resulting luminance.

Liquid crystal displays (LCDs) exhibit significant shifts in the transfer function as a function of viewing angle. This can be seen by looking at the patterns given here on a laptop and then tilting the screen back and forward (as you might need to do when traveling in a coach seat on an airplane).

A fundamental mechanism used to change luminance on an LCD is often the rotation of a polarizer. The underlying effect is much more like a sine wave. Most device manufacturers try to adjust the real device transfer function to appear to be a gamma function, but "less than perfect" devices often exhibit a transfer function that looks like an "S" curve.

The simulated transfer functions represent multiple points along a transfer function curve, i.e., a graph of input voltage verses output luminance.

The display device can be one of a variety of kinds of devices, such as a monochrome display device, a red, green, blue (RGB) display device, a projection display device, a wireless display device, a Personal Data Assistant (PDA), and so forth.

Generating (102) the multiple simulated transfer functions for the display device can be performed, for example, within a software application, such as Adobe® Photoshop and Adobe® Acrobat, or in a set-up program or routine associated with the display device.

Process 100 renders (104) multiple patterns of anti-aliased parallel lines on the display device. Each pattern is rendered according to a corresponding one of the candidate transfer functions, i.e., a simulated function is applied to an image before displaying it, so different parts of the image get different transfer functions. Line patterns start out anti-aliased in an ideal linear space. Then each pattern is transformed by the inverse of one of the candidate transfer functions and the whole image, including all the candidate patterns, is transformed by the user's display system. One of the candidate transform functions that is inverted will be closest to the display device, and the corresponding pattern will look the best.

In general, anti-aliasing is a smoothing of text or an image candidate, where aliasing is a generation of a false (alias) frequency along with a correct one when doing frequency sampling. For images, this produces a jagged edge, or stair-step effect. With images, anti-aliasing approaches include, for example, adjusting pixel positions or setting pixel intensities so that there is a more gradual transition between the color of a line and the background color.

Any suitable anti-aliasing technique can be used, such as those described by Scott R. Nelson in "High quality hardware line anti-aliasing," Journal of graphics tools 2(1): 29–46, 1997, and in "Twelve characteristics of correct anti-aliased lines," Journal of graphics tools 1(4):1–20, 1996.

Figure 2:
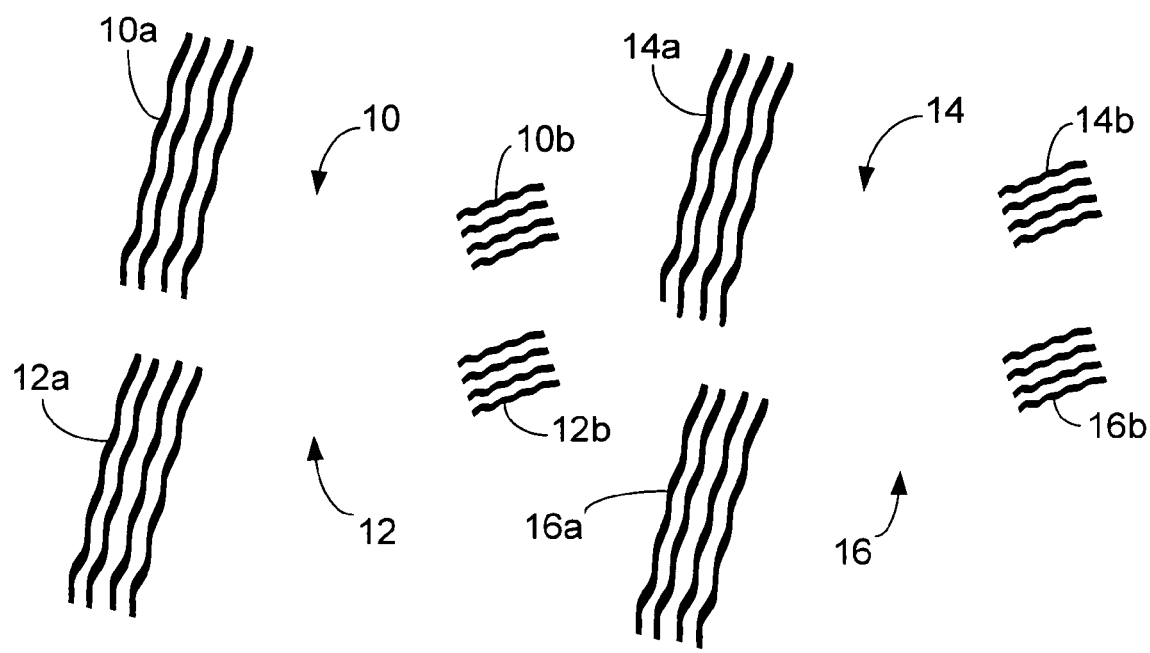
FIG. 2 is a block diagram.
Like reference numbers and designations in the various drawings indicate like elements.

As shown in FIG. 2, multiple patterns 10, 12, 14, 16 are rendered. Gamma can depend on pattern orientation. Because most displays are raster-scanned, patterns that have the same spatial frequency can have very different electronic frequencies. Typically, vertical lines require a high-frequency video signal while the same lines rotated ninety degrees produce a much lower frequency. Display devices with limited frequency response have a different effective gamma at high frequencies.

Each pattern 10, 12, 14, 16 includes two separate groups of slanted anti-aliased parallel lines, i.e., a first group 10a, 12a, 14a, 16a and a second group 10b, 12b, 14b, 16b. The first group of slanted lines 10a, 12a, 14, 16a are in a generally vertical orientation and represent an effect in a scan-line direction. The second group of slanted lines 10b, 12b, 14b, 16b are in a generally horizontal orientation and represent an effect between scan lines.

In a particular embodiment, patterns use varying line width and spacing for each candidate transfer function.

It is useful to sample a transfer function at several points. For samples at n points, one uses slopes of n and 1/n. For example, in Adobe's Acrobat®, one can use n=6, with 4.5 cycles.

In a particular embodiment, the display device can be physically rotated between a portrait mode and a landscape mode. This rotation changes the relationship between "vertical" and "scan-line."

Referring back to FIG. 1, process 100 receives (106) an input from a user of the display device selecting one of the patterns rendered on the display device. In a particular embodiment, the user is instructed to select one of the patterns having a most uniform thickness of lines. The user input can be, for example, a number, a letter or a mouse-click associated with, and choosing, one of the patterns rendered on the display device.

Process 100 sets (108) a transfer function for the display device to the simulated transfer function representing the selected pattern.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A computer program product, tangibly embodied in an information carrier, for selecting a transfer function for a display device, the computer program product being operable to cause data processing apparatus to:
   render multiple patterns of anti-aliased parallel lines on a display device, each pattern rendered according to a corresponding one of a plurality of simulated gamma functions;
   receive an input from a user of the display device that selects one of the patterns rendered on the display device; and
   set a gamma function for the display device to a simulated gamma function representing the selected pattern of anti-aliased parallel lines, the gamma function characterizing a non-linear relationship between an applied input voltage and an output luminance for any given pixel on the display device.

2. The computer program of claim 1 further operable to cause data processing apparatus to:
   generate multiple simulated gamma functions for the display device.

3. The computer program product of claim 1 wherein the gamma function characterizes a non-linear relationship between an applied input voltage and an output luminance for any given pixel on the display device.

4. The computer program of claim 1 further operable to cause data processing apparatus to:
   instruct the user to select one of the patterns having a most uniform thickness of lines.

5. The computer program product of claim 1 wherein each pattern comprises:
   a first group of slanted lines that are in a generally vertical orientation, the first group representing an effect in a scan-line direction; and
   a second group of slanted lines that are in a generally horizontal orientation, the second group representing an effect between lines.

6. The computer program product of claim 1 wherein the display device is a cellular telephone.

7. The computer program product of claim 1 wherein the display device is a personal data assistant (PDA).

8. The computer program product of claim 1 wherein the display device is a monochrome display device.

9. The computer program product of claim 1 wherein the display device is a red, green, blue (RGB) display device.

10. A system for selecting a transfer function for a display device, the system comprising:
    means for rendering multiple patterns of anti-aliased parallel lines on a display device, each pattern rendered according to a corresponding one of a plurality of simulated gamma functions;
    means for receiving an input from a user of the display device that selects one of the patterns rendered on the display device; and
    means for setting a gamma function for the display device to a simulated gamma function representing the selected pattern of anti-aliased parallel lines, the gamma function characterizing a non-linear relationship between an applied input voltage and an output luminance for any given pixel on the display device.

11. The system of claim 10 further comprising means for generating the multiple simulated gamma functions for the display device.

12. The system of claim 10 wherein the gamma function characterizes a non-linear relationship between an applied input voltage and an output luminance for any given pixel on the display device.

13. The system of claim 10 further comprising means for instructing the user to select one of the patterns having a most uniform thickness of lines.

14. The system of claim 10 wherein each pattern comprises:
    a first group of slanted lines that are in a generally vertical orientation, the first group representing an effect in a scan-line direction; and
    a second group of slanted lines that are in a generally horizontal orientation, the second group representing an effect between lines.

15. The system of claim 10 wherein the display device is a cellular telephone.

16. The system of claim 10 wherein the display device is a personal data assistant (PDA).

17. The system of claim 10 wherein the display device is a monochrome display device.

18. The system of claim 10 wherein the display device is a red, green, blue (RGB) display device.

19. A method comprising:
    generating multiple simulated transfer functions for a display device;

rendering multiple patterns of anti-aliased parallel lines on the display device, each pattern rendered according to a corresponding one of the simulated transfer functions;

receiving an input from a user of the display device selecting one of the patterns of anti-aliased parallel lines rendered on the display device; and setting a transfer function for the display device to the simulated transfer function representing the selected pattern, the transfer function characterizing a non-linear relationship between an applied input voltage and an output luminance for any given pixel on the display device.

20. The method of claim 19 further comprising instructing the user to select one of the patterns having a most uniform thickness of lines.

21. The method of claim 19 wherein the multiple simulated transfer functions are simulated gamma functions, each of the simulated gamma functions characterizing multiple non-linear relationships between the applied input voltage and the output luminance for any given pixel on the display device.

22. The method of claim 19 wherein each pattern comprises:

a first group of slanted lines that are in a generally vertical orientation, the first group representing an effect in a scan-line direction; and a second group of slanted lines that are in a generally horizontal orientation, the second group representing an effect between lines.

23. The method of claim 19 wherein generating multiple simulated transfer functions comprises generating multiple simulated transfer functions within a software application.

24. The method of claim 19 wherein the display device is a cellular telephone.

25. The method of claim 19 wherein the display device is a personal data assistant (PDA).

26. A method comprising:

rendering multiple patterns of anti-aliased parallel lines on a display device, each pattern rendered according to a corresponding one of a plurality of simulated gamma functions;

receiving an input from a user of the display device that selects one of the patterns rendered on the display device; and setting a gamma function for the display device to a simulated gamma function representing the selected pattern of anti-aliased parallel lines, the gamma function characterizing a non-liner relationship between an applied input voltage and an output luminance for any given pixel on the display device.

27. The method of claim 26 wherein rendering further comprises generating the multiple simulated gamma functions for the display device.

28. The method of claim 26 wherein the gamma function characterizes a non-linear relationship between an applied input voltage and an output luminance for any given pixel on the display device.

29. The method of claim 26 further comprising instructing the user to select one of the patterns having a most uniform thickness of lines.

30. The method of claim 26 wherein each pattern comprises:

a first group of slanted lines that are in a generally vertical orientation, the first group representing an effect in a scan-line direction; and a second group of slanted lines that are in a generally horizontal orientation, the second group representing an effect between lines.

31. The method of claim 26 wherein the display device is a cellular telephone.

32. The method of claim 26 wherein the display device is a personal data assistant (PDA).

33. A method comprising:

generating multiple simulated transfer functions for a display device;

rendering multiple patterns of anti-aliased parallel lines on the display device, each pattern rendered according to a corresponding one of the simulated transfer functions and including off-vertical lines and off-horizontal lines;

receiving an input from a user of the display device selecting one of the patterns rendered on the display device; and setting a transfer function for the display device to a simulated transfer function representing the selected pattern of anti-aliased parallel lines, the transfer function characterizing a non-linear relationship between an applied input voltage and an output luminance for any given pixel on the display device.

34. The method of claim 33 further comprising instructing the user to select one of the patterns having a most uniform thickness of lines.

35. The method of claim 33 wherein the display device is a red, green, blue (RGB) display device.

36. The method of claim 33 wherein the display device is a monochrome display device.

* * * * *

UNITED STATES PATENT AND TRADEMARK OFFICE
CERTIFICATE OF CORRECTION

PATENT NO. : 6,975,332 B2
APPLICATION NO. : 10/795681
DATED : December 13, 2005
INVENTOR(S) : R. David Arnold and Terence S. Dowling It is certified that error appears in the above-identified patent and that said Letters Patent is hereby corrected as shown below:

Column 5, line 61, after "program", insert --product--;
Column 6, line 3, after "program", insert --product--.

Signed and Sealed this

First Day of August, 2006

JON W. DUDAS
*Director of the United States Patent and Trademark Office*